United States Patent [19]

Schottler

[11] Patent Number: 4,667,525

[45] Date of Patent: May 26, 1987

[54] VARIABLE SPEED FRICTIONAL DRIVE TRANSMISSIONS

[76] Inventor: Henry Schottler, 346 SE. Verada Ave., Port St. Lucia, Fla. 33452

[21] Appl. No.: 800,655

[22] Filed: Nov. 22, 1985

Related U.S. Application Data

[63] Continuation-in-part of Ser. No. 683,585, Dec. 19, 1984, which is a continuation-in-part of Ser. No. 490,442, May 5, 1983, and a continuation-in-part of Ser. No. 391,152, Jun. 22, 1982, abandoned.

[51] Int. Cl.⁴ .................. F16H 15/26; F16H 15/50
[52] U.S. Cl. .................................. 74/198; 74/796
[58] Field of Search ............. 74/198, 200, 190.5, 74/796, 690, 190

[56] References Cited

U.S. PATENT DOCUMENTS

| | | | |
|---|---|---|---|
| 2,590,800 | 3/1952 | Stephenson | 74/198 |
| 3,248,960 | 5/1966 | Schottler | 74/198 |
| 4,314,485 | 2/1982 | Adams | 74/196 |
| 4,570,501 | 2/1986 | Perry | 74/690 |
| 4,593,574 | 6/1986 | Sinn et al. | 74/198 |

FOREIGN PATENT DOCUMENTS

| | | | |
|---|---|---|---|
| 2658791 | 6/1978 | Fed. Rep. of Germany | 74/198 |
| 2928127 | 2/1981 | Fed. Rep. of Germany | 74/198 |

Primary Examiner—Andrew V. Kundrat
Assistant Examiner—Peter M. Cuomo
Attorney, Agent, or Firm—Carroll F. Palmer

[57] ABSTRACT

Variable speed frictional drive transmissions that basically depend on driving balls arranged in constant rolling frictional contact with a pair of inner and a pair of outer concentric and axially separable ball races are improved by the provision of (1) new speed control units for changing the relative positions of balls and races to produce desired speed changes and (2) new cam and roller units for maintaining the balls and races in forced contact even when the transmissions are under no-load condition. The new transmissions are characterized by (A) outer and inner circular concave race tracks and (B) a simplified hydraulic feed-back control mechanism which displaces the outer control race only in the direction of speed increase, while its opposite displacement is actuated by torque forces plus spring pressure.

In contrast to prior devices of their class, the new transmissions (a) do not produce any gyrotory forces at any speed of operation, (b) do not increase input torque requirements as output speed is decreased, (c) do not have parts that may get out of phase when the transmissions are under no-load condition and (d) have greater power capacity per unit size.

4 Claims, 5 Drawing Figures

VARIABLE SPEED FRICTIONAL DRIVE TRANSMISSIONS

CROSS-REFERENCE TO RELATED APPLICATIONS

This application is a continuation-in-part of copending application Ser. No. 683,585, filed Dec. 19, 1984, for Variable Speed Friction Drive Transmissions, which, in turn, is a continuation-in-part of application Ser. No. 490,442, filed May 5, 1983, and a continuation-in-part of application Ser. No. 391,152, filed June 22, 1982 (abandoned). The disclosures of all these prior applications are incorporated herein by reference.

BACKGROUND OF THE INVENTION

1. Field of the Invention

This invention relates generally to variable speed friction drive transmissions. More paricularly, it concerns such transmissions that have high torque carrying capacities and are capable of providing infinitely variable speed reduction over a substantiailly wide range.

2. Description of the Prior Art

The prior art is replete with disclosures of many different forms of variable speed transmissions. One important class of such transmissions are those which permit infinite variation of the speed of a rotary output shaft being driven by a rotary input shaft. The present invention concerns this class of transmissions.

There are a variety of types of transmissions within the above indicated class, e.g., mechanical torque converters and hydraulic torque converters. The present invention relates to mechanical type torque converters comprising driving balls arranged in constant rolling frictional contact with pairs of inner outer concentric and axially moveable ball races. Such transmissions are generally referred to as variable speed friction drive (VSFD) transmissions. The essential requirements for economical VSFD transmissions for a wide speed range are outlined in my prior U.S. Pat. No. 3,248,96, the disclosure of which is incorporated herein by reference.

I have previously developed a variety of VSFD transmission mechanisms on which I have obtained a number of other U.S. patents including the following:

| | |
|---|---|
| 2,586,725 | 3,238,816 |
| 3,229,538 | 3,707,888 |
| 3,237,468 | 3,745,844. |

The present invention is basically an improvement in the form of variable speed transmission disclosed in my previous U.S. Pat. No. 3,707,888.

Examples of additional patents related to VSFD transmission mechanisms include:

| U.S. Pat. No. | 2,701,970 | 3,793,907 | 3,258,981 |
|---|---|---|---|
| | 4,480,491 | 4,503,275 | |
| Canadian | 526,665 | | 614,725 |
| W. German | 2,331,199 | | 3,215,923 |
| Great Britain | 1,376,057. | | |

In spite of the extensive development work that has been done on VSFD transmissions as disclosed in the foregoing and numerous other prior patents and publications, there exists a need for further improvements in such type mechanisms. For example, improvements are needed to permit the VSFD transmissions to be made more compact and energy efficient.

Another problem with prior known devices of this class has been that paired ramp portions my get out of phase with when the transmissions are under a no-load condition. Such phase disruptions can seriously damage the mechanism.

A further problem in prior VSFD transmissions of great importance has been the variation in force required to turn the input shaft as the output shaft has been adjusted from low speed to high speed. The present invention offers improvements in VSFD transmissions to correct these deficiencies of the prior known devices.

OBJECTS

A principal object of this invention is the provision of new improvements in mechanical variable speed frictional drive transmissions comprising driving balls arranged in constant rolling frictional contact with pairs of inner and outer concentric and axially separable ball races, referred to in this disclosure as VSFD transmissions.

Further objects of the invention include the provision of:

1. Improved VSFD transmissions suitable for use with vehicular as well as stationary applications.

2. VSFD transmissions that are relatively small in size and less expensive as compared to automatic hydraulic transmissions of comparable torque and speed capacities.

3. VSFD transmissions that eliminate the need for associated clutches, brakes, gear-trains and automatic gear shifting units to function over a full range of rated torque and speed.

4. Such VSFD transmissions having efficiency characteristics that make them especially ideal for automotive use and when so applied serve as a brake, without any adjustment, during downhill driving of the automobile in which they are used.

5. New VSFD transmissions that do not produce a gyrotory action as in a variety of know transmissions of the same general type.

6. Improved VSFD transmissions that operate in both directions in a broad speed range, in a zero speed condition and are not free-wheeling.

7. New VSFD transmissions in which the force required to turn the input shaft remains substantially constant across the full range of speed adjustment of the output shaft.

8. Such VSFD transmissions that do not experience ramp phasing problems when operated in a no-load mode.

9. Such VSFD transmissions that can be driven with high input speed so they can be very compact and be used for a vast number of applications, e.g., riding mowers, motor cycles, small tractors, etc.

Other objects and further scope of applicability of the present invention will become apparent from the detailed description given herinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The foregoing objects can be accomplished in accordance with the present invention, in part, by providing VSFD transmissions with new forms of speed control means that enable the input torque required to drive the output drive shaft, when under a given loading, to remain substantially constant over the entire range of speed change of the transmissions. Such control means operate on the outer, input end race of the ball and race drive section of the VSFD transmissions.

The improvements of the invention apply to VSFD transmissions comprising a housing having an input side and an opposed output side; driving balls arranged within the housing in constant rolling frictional contact with a pair of inner and a pair of outer concentric and axially moveable ball races; a rotary input shaft, a portion of which extends externally from the input side of the housing, arranged to rotate a race of the inner pair concentric with the input shaft and a rotary output shaft, a portion of which extends externally from the output side of the housing, coaxial with the input shaft arranged by connection with the output side race of the outer pair to be driven by the balls rotating within the housing concentric with the shafts.

The invention improvements comprise providing within the housing of the VSFD transmission the combination of (A) a circular concave inner face in running contact with the driving balls on the input side race of the outer pair of races, (B) means preventing the input side outer race from concentric rotation relative to the housing while allowing movement thereof axially of the shafts, (C) the output side race of the outer pair being bell shaped and being joined at its output side end to the output shaft, and (D) hydraulic means to apply axial pressure to the input side outer race to force it to move axially of the input and output shafts in the direction of the output side of the housing.

In the preferred embodiments of the new transmissions, (E) the input side outer race has a flat radial face which in combination with the inside surface of the input side of the housing forms a variable size, fluid pressure chamber. Further, there are (F) an inlet into the fluid pressure chamber, (G) slide valve control means for regulating flow of fluid through the inlet into the chamber comprising an elongated, axially moveable, ported, tubular valve member and an elongated, tubular, ported bushing axially slideable on the valve member, (H) an elongated bushing concentric with and keyed to the input shaft, (I) the input side race of the inner pair being keyed to the bushing, but capable of axial movement thereon, (J) the output side race of the inner pair is carried on the bushing for rotational and axial movement thereon, (K) an angular bushing is carried on the elongated bushing for rotational and axial movement thereon and (L) the angular bushing has a cavity in its inner face which contains a coil spring compressed against the side of the output side race of the inner pair whereby the output side race is continually biased toward the input side race of the inner pair.

BRIEF DESCRIPTION OF THE DRAWINGS

A more complete understanding of new VSFD transmissions of the invention may be had by reference to the accompanying drawings in which.

DESCRIPTION OF THE PREFERRED EMBODIMENTS

Structure

Figure 1:
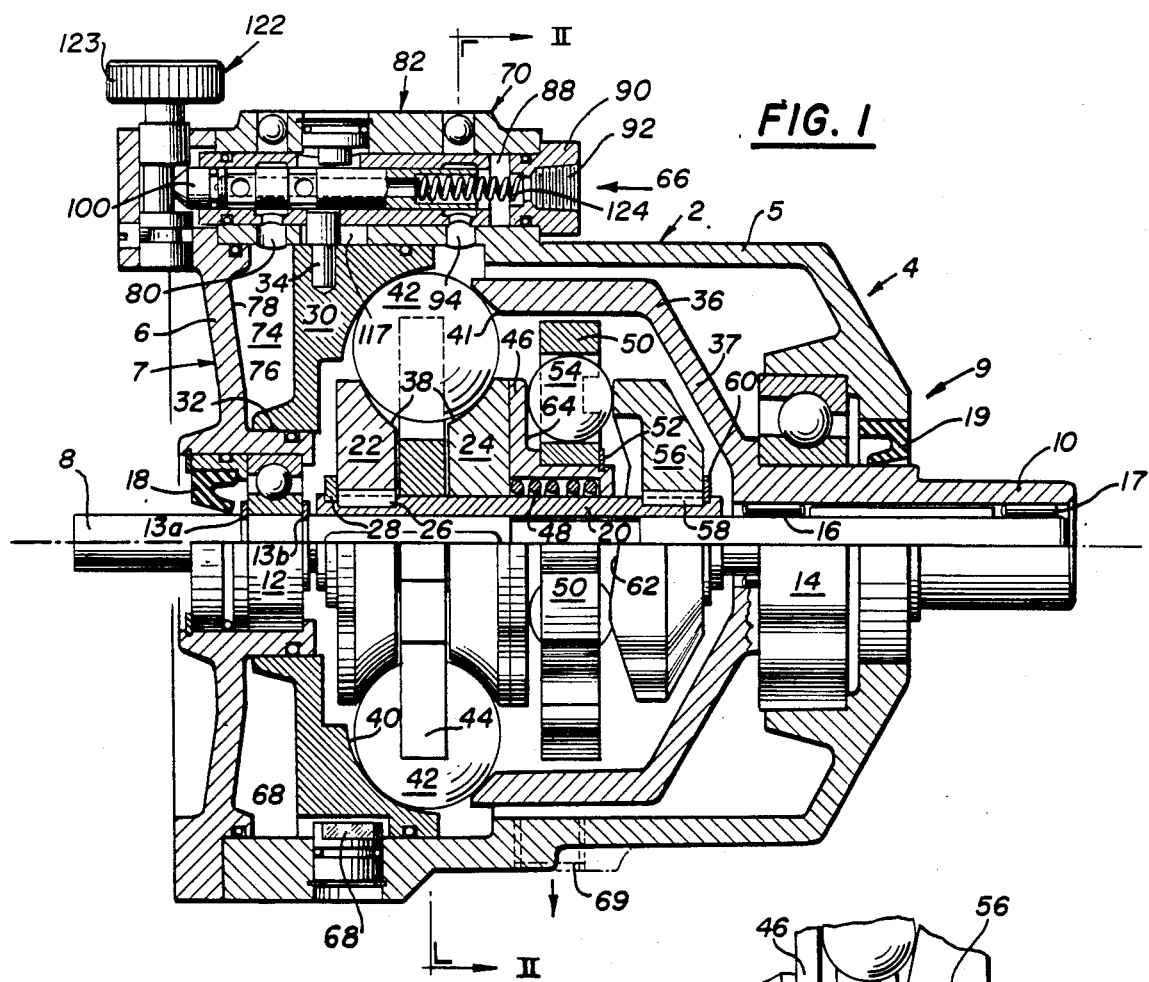
FIG. 1 is a longitudinal, sectional view, taken on line I—I of FIG. 2, of a VSFD transmission incorporating novel features and advantages of the present invention.

With reference in detail to the drawings, the VSFDT 2 comprising a sealed housing 4 consisting of a major bell member 5 and a removeable cover plate 6, has at the input end 7 an input shaft 8 and at the output end 9 an output shaft 10. The shafts 8 and 10 are rotatably supported, but axially fixed, in the housing 4 by respective ballbearings 12 & 14. The shaft 8 is also supported within the shaft 10 by needle bearings 16 & 17.

Bearing 12 is positioned by snap-rings 13a & 13b on shaft 8. Seal units 18 & 19 are associated respectively with bearings 12 & 14 to insure fluid seal integrity of the housing 4.

A bushing 20 surrounds the shaft 8 to which it is keyed to freely slide axially on, but rotate fixedly with the shaft 8. The bushing 20 supports first and second inner races 22 and 24 respectively. Race 24 is free to rotate and slide axially on bushing 20. The race 22 is fixed to the bushing 20 by the key 26 and snap-ring 28.

An input end outer race 30 is supported upon the inner cylindrical surface 32 of the end plate 6 and is keyed to housing 4 by key 34 to slide freely axially, but be prevented from rotating concentrically with the shaft 8.

A second outer race 36 of bell shape is fixed at its output end 37 to the shaft 10 by being made integral therewith.

The inner races 22 & 24 have inner concave racetracks 38. Input end outer race 30 has concave racetrack 40 while output end outer race 36 has a straight race-track 41.

Drive balls 42, preferably six in number, are carried between and in frictional contact with the race-tracks 38, 40 & 41.

The drive balls 42 are circumferentially separated by the retainer 44 that is journalled on the bushing 20.

An angular circular part 46, which abuts against the flat side of race 24 is rotatably and axially slideable carried on bushing 20. It encloses a coil-spring 48 used to preload race 24 at all times against balls 42, even under zero load conditions.

A retainer ring 50, which is rotatably journalled on the part 46 and held in position by snap ring 52, positions a plurality, preferably three, of balls 54 circumferentially equally spaced from one another.

A ring cam 56, which is fixed on bushing 20 by key 58 and snap-ring 60, has formed therein a plurality of ramps 62a & 62b. The balls 54 are forced into rolling contact with the ramps 62a & 62b and face 64 of part 46 by the pressure exerted on race 24 by the balls 42.

In operation, the VSFDT 2 is charged via lube inlet 66 with a quantity of suitable lubricant that may be changed periodically through drains 68.

The speed control unit 70 comprises a variable size, fluid pressure chamber 74 defined by the flat radial face 76 of race 30 and the inside surface 78 of the input side plate 6 of the housing 4.

Chamber 74 has an inlet 80 and slide valve control means 82, which operates on the feed-back principle and regulates flow of fluid through the inlet 80 into the chamber 74, comprises an elongated, axially moveable, ported, tubular valve member 84 and an elongated, tubular, ported bushing 86 axially slideable on the valve member 84.

The valve control means 82 includes a chamber 88 closed at one end by the cap 90 having a port 92 by which the VSFDT 2 is connected to a source of pressurized lubricant (not shown). Valve means 82 also includes a port 94 into the housing 4.

The valve member 84 has lands 96 & 98 , a plunger end 100 and a central bore 102 with connected lateral ports 104 & 106.

The bushing 86 comprises central bore 108, lateral ports 110 & 112 associated respectively with lands 114 & 116. The key 34 serves fix the bushing 86 relative to the race 30 while permitting axial movement in chamber 88 because of the slot 117 in the housing member 5.

The bores 118 and sealing balls 120 serve only to permit the housing 4 to be machined to provide the ports 110 & 112.

The valve means 82 includes a cam member 122, with control knob 123, that operates on the plunger end 100 of member 84 to move it axially in the chamber 88 against the biasing force of the spring 124. Means 82 also has a stopper 126 which is retained in place by the snap ring 128. The lug 130 on the stopper 126 functions with the slot 132 in the bushing 86 to prevent rotation of the bushing 86.

Any axial movement of the valve member 84 will be followed by a related move of the bushing 86 because the hydraulic fluid supplied under pressure through the port 92 into bor 102 flows through inlet 80 or port 94, depending whether member 136 is moved toward or away from the port 92. This forces the race 30 to the right or the left producing similar movement in bushing 86 via the key 34 and it will move until the lands 114 & 116 return to the neutral position closing ports 110 & 112 to fluid flow. This feedback system thereby holds the VSFDT 2 to the new speed dictated by the control movement of the cam member 122.

Operation

The input shaft 8 is driven by any suitable power source, e.g., the engine of a motor vehicle.

A pump (not shown) constantly supplies oil from the speed control unit 70 through port 92.

Due to the preload effect of spring 48, the inner races 22 & 24 are rotated at the speed of the shaft 8.

Due to frictional engagement of the balls 42 with races 22 & 24 and since the axially opposing circular races are equal, the balls rotate in planetary fashion around an axis parallel to the input & output shafts thereby producing no gyrotory forces. Due to frictional engagement of the balls 42 with races 30 & 36, the output shaft 10 is forced to also rotate, but at a speed different from shaft 8.

Figure 3:
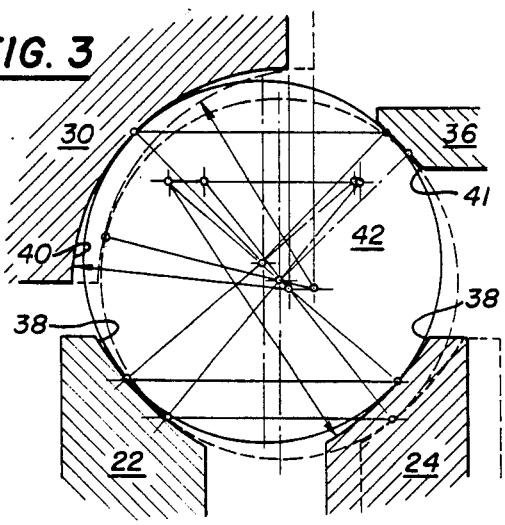
FIG. 3 is an enlarged schematic view of a driving ball and races of the new transmission of FIG. 1, illustrating how the variable speed function is attained through the balls and races.
Figure 4:
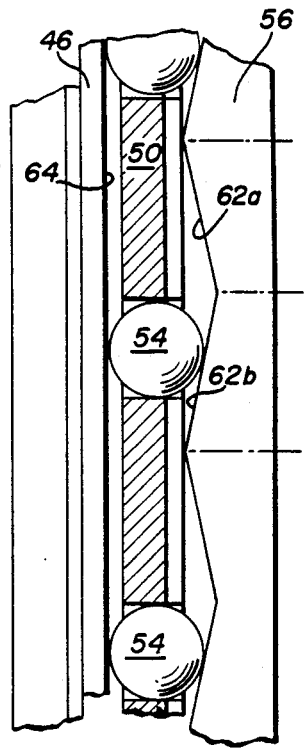
FIG. 4 is a developmental view of the adjustable mechanism for providing contact pressure between driving balls and races in operation of the transmission of FIG. 1.
Figure 2:
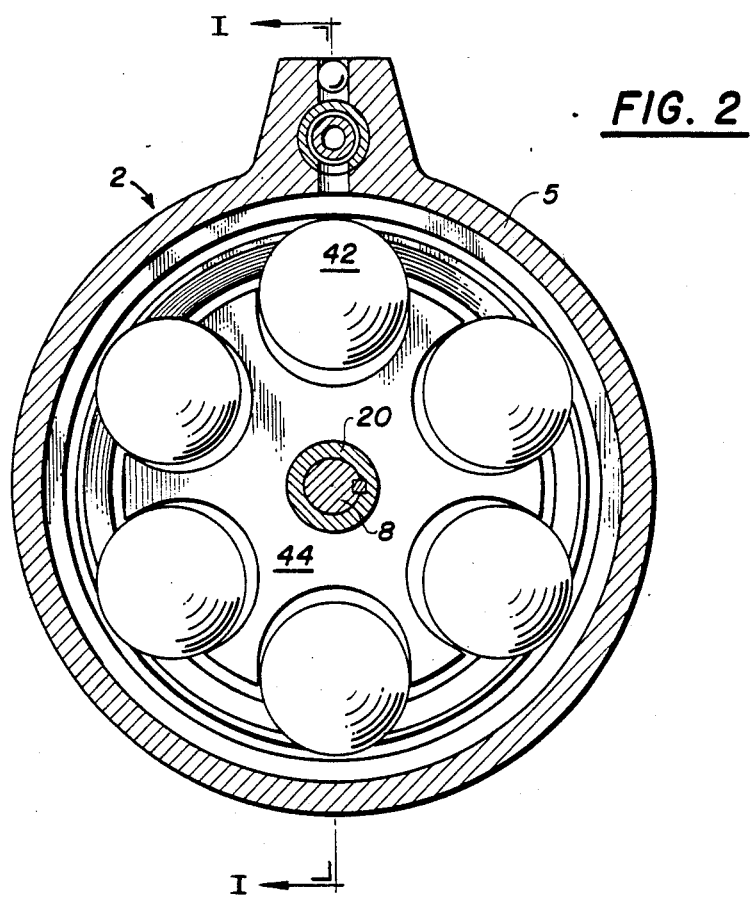
FIG. 2 is a sectional view taken on the line II—II of FIG. 1.
Figure 5:
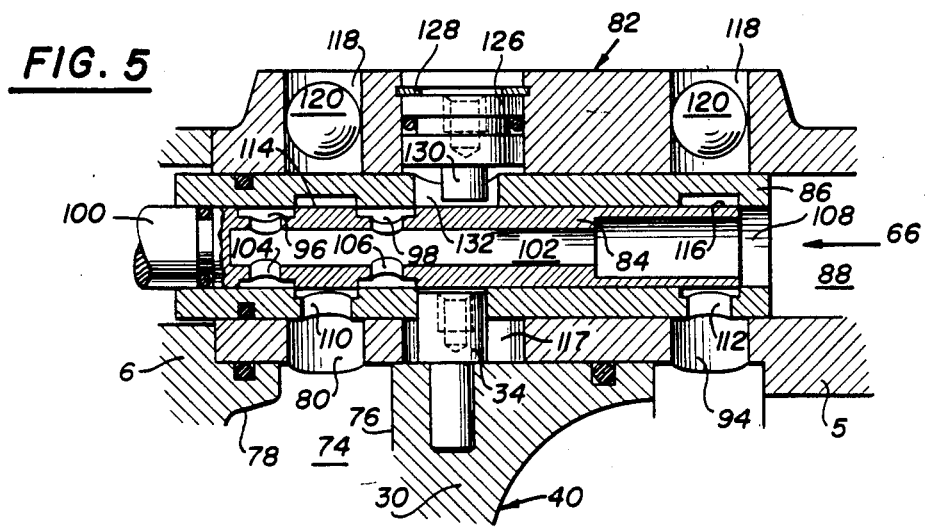
FIG. 5 is an enlarged, fragmentary, sectional view of the speed control valve means used in the transmission shown in FIG. 1.

The difference in speed of rotation of shaft 8 and shaft 10 via the ball/race system as indicated depends on contact-tracks that exist, as the transmission 2 operates, between balls 42 and races 22 & 24 vs. races 30 & 36. Various possible contact-tracks are possible as shown by FIG. 3. Very important also, is that the ramp-angle of part 56 can be constant resulting in values of T/P=tangential to perpendicular forces are near constant over the entire speed and power range of the new VSFD transmissions. In addition, these values are about the same for the inner as well as the outer races.

The contact-track variations that occur in the operation of the transmission 2 is controlled by the axial position of the control valve member 84 as adjusted by the dial knob 123. As an alternative, the valve member 84 can be controlled by other movement means, e.g., a gas pedal in a motor vehicle installation.

Any axial change in the valve member 84 results in an axial position change in the outer race 30. This consequently results in a change in the contract-track between balls 42 and races 22, 24, 30 & 36 plus resultant change in the rotation speed of shaft 10. For example, at a certain speed-ratio, an axial move of the valve member 84 to the right, causes oil to flow through inlet 80 into chamber 74, moving outer race 30 to the right producing an output speed increase. In contrast, an axial move to the left of member 84 causes oil to flow through port 94 into the housing 4, moving outer race 30 (assisted by output torque) to the left producing an output speed decrease. Thus, any given axial position of valve member 84 will be answered by a certain speed ratio between input shaft 8 and output shaft 10.

To secure near positive power transmission between drive balls and races at any given output torque, the related input torque between the inner races 22 & 24 and the balls 42 over the balls 54 against the ramps 62a or 62b of ring cam 56 produce via a related ramp angle, the necessary contact pressure between the drive balls and all the races.

The VSFDT 2 is constructed so as to allow a certain axial movement between ring cam 56 plus ramps 62 and race 22 over the capacity range of the transmission. In most prior known VSFD transmissions, there is practically no axial movement between ramps and races.

In some applications, it is advantageous to provide reverse action, e.g., when the output torque becomes negative as in automobiles going downhill. This is provided in the present invention by the preloading effect of spring 48 which keeps balls 54 always in solid contact with part 46 and ramps 62a & 62b.

Since the position of race 22 due to the race profile varies axially by speed change, the bushing 20 is axially free to adjust accordingly.

Using properly compounded oils, e.g., "Monsanto Oil", which increase considerably the coefficient of friction, there is placed on the rolling surfaces of the transmission a thin layer of a kind of plastic under high contact pressures which prevent metal to metal contact. This prevents wear and tear of rolling members, thereby increasing considerably the life expectancy of the new devices.

The output speed range of a transmission as shown and described is about 0 to 45% of the input speed.

Since the drive balls in the new VSFD transmissions do not produce gyrotory forces, they do not limit the permissible input speeds by ball slippage as in prior known designs, particularly at lower transmission power when the contact pressure between races and balls is low. This means that the new units of the invention can be very compact and be used for considerable capacity in a vast number of applications. Their operation is smooth and quiet like a ball-bearing. Noteworthy also is the fact that with increasing output speed, when the output torque is lower, that with decreasing contact angle between the drive balls and the outer control race 30, the contact pressures are decreasing. Since all other contact angle between the drive balls and races 22, 24 & 36 remain about 45°, the efficiency characteristics of the new VSFDTs is high. Due to the 45° angle of the output race 36, the thrust load on the bearing 14 is only 0.7 of the contact pressure between the drive balls 42 and the output race 36.

Also, due to the circular concave shape of the inner races, the ramps 62 can be straight for safe slipless operation over the entire speed range. Further, with every change of speed ratio, all race tracks are changed thereby, over the life of the transmission, providing an additional safety factor.

For reverse action, a simple clutch or forward-reverse gear arrangement can be applied. Also, the transmissions may include conventional oil cooling systems of suitable cooling capacity dependent on the size and application of the units.

CONCLUSION

The new devices of the invention possess high efficiency characteristics and without interruption of power flow over the entire range of operation with about constant engine speed at maximum efficiency. Hence in automotive applications, especially smooth driving can be expected.

Without downhill driving and without any adjustment, the new transmissions serve as a brake.

Assembly and disassembly of the new units is easy and without complications.

For special applications and power split arrangements, the input shaft may extend through the output shaft to couple with the attachment.

Due to the ideal load characteristics of normal driving, concerning life expectancy over the entire speed range in automotive applications, the size of the new units of the invention is small and less expensive as compared to the known automatic hydraulic transmissions. Also, costly circuitry, necessary to engage and disengage clutches and brakes for a number of required gears for a desired torque range, is eliminated in the new transmissions. Thus, the new devices need in most applications only a forward and reverse arrangement. This means also that at about constant engine speed, the entire desired speed range can be obtained without power interruption.

The embodiments of the invention in which an exclusive property or privilege is claimed are defined as follows:

1. In a variable speed friction drive transmission comprising a housing having an input side and an opposed output side; driving balls arranged within said housing in constant rolling frictional contact with an input pair of concentric and axially moveable ball races consisting of input inner race and an imput outer race and an output pair of concentric and axially moveable ball races consisting of an output inner race and an output outer race; a rotary input shaft, a portion of which extends externally from said input side of said housing, arranged to rotate a race of said inner pair concentric with said input shaft; a rotary output shaft, a portion of which extends externally from said output side of said housing, coaxial with said input shaft arranged by connection with said output outer race to be driven by said balls rotating within said housing concentric with said shafts, the improvement which comprises within said housing the combination of:

a circular concave inner face in running contact with said driving balls on said input outer race, means preventing said input outer race from concentric rotation relative to said housing while allowing movement thereof axially of said shafts, and means to apply axial pressure to said input outer race to force it to move axially of said shafts in the direction of said output side said input outer race includes a flat radial face which in combination with the inside surface of said input side of said housing forms a variable size, fluid pressure chamber, an inlet into said fluid pressure chamber and slide valve control means for regulating flow of fluid through said inlet into said chamber, an elongated bushing concentric with and keyed to said input shaft, said input inner race being keyed to said bushing but capable of axial movement thereon and the output inner race being carried on said bushing for rotational and axial movement thereon, and an angular bushing carried on said elongated bushing for rotational and axial movement thereon, said angular bushing having a cavity in its inner face which contains a coil spring compressed against the side of said output inner race whereby said output inner race is continually biased toward said input inner race.

2. The transmission of claim 1 wherein said output outer race is bell shaped and is joined at its output side end to said output shaft.

3. The transmission of claim 1 wherein said slide valve control means comprises an elongated, axially moveable, ported, tubular valve member and an elongated, tubular, ported bushing axially slideable on said valve member.

4. In a variable speed friction drive transmission comprising a housing having an input side and an opposed output side; driving balls arranged within said housing in constant rolling frictional contact with an input pair of concentric and axially moveable ball races consisting of imput inner race and an input outer race and an output pair of concentric and axially moveable ball races consisting of an output inner race and an output outer race; a rotary input shaft, a portion of which extends externally from said input side of said housing, arranged to rotate a race of said inner pair concentric with said input shaft; a rotary output shaft, a portion of which extends externally from said output side of said housing, coaxial with said input shaft arranged by connection with said output outer race to be driven by said balls rotating within said housing concentric with said shafts, the improvement which comprises within said housing the combination of:

a circular concave inner face in running contact with said driving balls on said input outer race, means preventing said input outer race from concentric rotation relative to said housing while allowing movement thereof axially of said shafts, said output outer race being bell shaped and being joined at its output side end to said output shaft, hydraulic means to apply axial pressure to said input outer race to force it to move axially of said shafts in the direction of said output side, said input outer race having a flat radial face which in combination with the inside surface of said input side of said housing from a variable size, fluid pressure chamber, an inlet into said fluid pressure chamber and slide valve control means for regulating flow of fluid through said inlet into said chamber comprising an elongated, axially moveable, ported, tubular valve member and an elongated, tubular, ported bushing axially slideable on said valve member, an elongated bushing concentric with and keyed to said input shaft, the input side race of said inner pair being keyed to said bushing but capable of axial movement thereon and the output inner race being carried on said bushing for rotational and axial movement thereon, an angular bushing carried on said elongated bushing for rotational and axial movement thereon, said angular bushing having having a cavity in its inner face which contains a coil spring compressed against the side of said output inner race whereby said output inner race is continually biased towards said input inner race.

* * * * *